(12) United States Patent
Medbo et al.

(10) Patent No.: US 8,891,657 B2
(45) Date of Patent: Nov. 18, 2014

(54) TRANSMISSION POWER DISTRIBUTION FOR MIMO COMMUNICATIONS WHEN MULTIPLICATIVE NOISE LIMITED

(71) Applicants: Jonas Medbo, Uppsala (SE); Henrik Asplund, Stockholm (SE); Mikael Coldrey, Landvetter (SE); Andreas Nilsson, Göteborg (SE); Mathias Riback, Täby (SE); Karl Werner, Segeltorp (SE)

(72) Inventors: Jonas Medbo, Uppsala (SE); Henrik Asplund, Stockholm (SE); Mikael Coldrey, Landvetter (SE); Andreas Nilsson, Göteborg (SE); Mathias Riback, Täby (SE); Karl Werner, Segeltorp (SE)

(73) Assignee: Telefonaktiebolaget L M Ericsson(publ), Stockholm (SE)

( * ) Notice: Subject to any disclaimer, the term of this patent is extended or adjusted under 35 U.S.C. 154(b) by 55 days.

(21) Appl. No.: 13/714,646

(22) Filed: Dec. 14, 2012

(65) Prior Publication Data
US 2014/0169490 A1    Jun. 19, 2014

(51) Int. Cl.
| | |
|---|---|
| H04L 1/02 | (2006.01) |
| H04W 52/34 | (2009.01) |
| H04W 52/24 | (2009.01) |
| H04B 7/04 | (2006.01) |
| H04W 52/42 | (2009.01) |

(52) U.S. Cl.
CPC .......... *H04W 52/241* (2013.01); *H04W 52/346* (2013.01); *H04W 52/248* (2013.01); *H04W 52/42* (2013.01); *Y02B 60/50* (2013.01); *H04W 52/247* (2013.01); *H04B 7/0443* (2013.01)
USPC ......................................................... 375/267

(58) Field of Classification Search
CPC ...... H04L 1/0618; H04L 1/06; H04B 7/0417; H04B 7/0413; H04B 7/0426
USPC .................. 375/267, 299, 347, 349; 370/277; 455/67.11, 501
See application file for complete search history.

(56) References Cited

U.S. PATENT DOCUMENTS

| | | |
|---|---|---|
| 7,505,529 B2 | 3/2009 | Kwak et al. |
| 7,729,232 B2 | 6/2010 | Wang et al. |
| 8,094,744 B1 | 1/2012 | Song et al. |
| 8,446,318 B2 | 5/2013 | Ali et al. |
| 8,588,324 B2 | 11/2013 | Mondal et al. |
| 2005/0088358 A1 | 4/2005 | Larry et al. |
| 2007/0115180 A1 | 5/2007 | Kish et al. |
| 2009/0086648 A1 | 4/2009 | Xu et al. |

(Continued)

OTHER PUBLICATIONS

Baum, D. et al., "Impact of Phase Noise on MIMO Channel Measurement Accuracy", IEEE 60th Vehicular Technology Conference, Sep. 26, 2004, pp. 1614-1618, vol. 3, IEEE.

Lozano, A. et al., "Mercury/Waterfilling: Optimum Power Allocation with Arbitrary Input Constellations", International Symposium on Information Theory, Proceedings, Sep. 4, 2005, 1773-1777, IEEE.

(Continued)

*Primary Examiner* — Khai Tran
(74) *Attorney, Agent, or Firm* — Coats & Bennett, P.L.L.C.

(57) ABSTRACT

Throughput conditions limited by multiplicative noise may be improved by distributing a transmission power across MIMO data streams communicated between MIMO communication nodes. In particular, the transmission power is distributed based on knowledge at the transmitter of the MIMO channel to decrease the transmission power allocated to one or more of the data streams associated with a dominant signal path relative to the transmission power allocated to one or more data streams associated with a weaker signal path to increase at least one of a quality and a throughput condition of the MIMO channel.

37 Claims, 10 Drawing Sheets

(56) References Cited

U.S. PATENT DOCUMENTS

| | | | |
|---|---|---|---|
| 2009/0186658 A1 | 7/2009 | Jiang et al. | |
| 2010/0002801 A1 | 1/2010 | Jia et al. | |
| 2010/0291865 A1 | 11/2010 | Gore et al. | |
| 2011/0051834 A1* | 3/2011 | Lee et al. | 375/267 |
| 2012/0120997 A1 | 5/2012 | Park et al. | |
| 2012/0157001 A1* | 6/2012 | Chiu et al. | 455/67.11 |
| 2014/0029509 A1* | 1/2014 | Murakami et al. | 370/315 |

OTHER PUBLICATIONS

Yoo, T. et al. "Multi-Antenna Downlink Channels with Limited Feedback and User Selection." IEEE Journal on Selected Areas in Communications, vol. 25, No. 7, Sep. 2007, pp. 1478-1491.

Grant, S. et al. "Performance Enhancement Through Joint Detection of Cochannel Signals Using Diversity Arrays." IEEE Transactions on Communications, vol. 46, No. 8, Aug. 1998, pp. 1038-1049.

* cited by examiner

TRANSMISSION POWER DISTRIBUTION FOR MIMO COMMUNICATIONS WHEN MULTIPLICATIVE NOISE LIMITED

BACKGROUND

Multiple Input Multiple Output (MIMO) communication is becoming an integral part of current and future wireless communication standards. Using multiple transmit and receive antennas, MIMO communications enable multiple data streams to be conveyed simultaneously and independently between the transmitter and the receiver without consuming additional bandwidth or other radio resources. To that end, the transmitter and/or receiver comprise an antenna array having multiple antennas, each associated with a variable antenna weight, where the antenna weights at the transmitter are generally referred to as pre-coders. Through the use of the weighted transmitter and/or receiver antennas, different patterns may be formed for different data streams. If the wireless radio channel exhibits rich scattering, e.g., low correlation or a small singular value spread, then multiple possible propagation paths exist between the transmitter and receiver, allowing different data streams to be transmitted by orthogonal mapping over the different paths.

The receiver must process the received composite signal to separate and decode each of the transmitted data streams. To that end, conventional systems use linear receivers, e.g., minimum mean square error (MMSE) receivers, or non-linear receivers, e.g., maximum likelihood (ML) receivers. The ability of either type of receiver to separate the transmitted data streams present in a received composite signal depends on the orthogonality between the channels of the individual data streams. In general, the separation will not be perfect, leading to inter-stream interference, which limits the achievable signal-to-noise ratio (SNR) or signal-to-interference plus noise ratio (SINR) for each signal stream. The more the data stream channels resemble each other, the more difficult it will be for the receiver to separate the data streams. Channel similarity may be expressed based on the cross-correlation of the channels, through an alternative measure known as the singular value spread (which is derived based on the channel). A large singular value spread indicates highly similar channels, and thus, a difficult receiver problem. Therefore, the best conditions for MIMO communications occur when the SNR or SINR is high and the wireless channel experiences rich scattering, as indicated by low correlation or a small singular value spread.

Unfortunately, to some extent the beneficial channel conditions for MIMO are mutually exclusive, meaning the highest SNR or SINR conditions often occur at the same time as the lowest experienced channel richness, and vice versa. This problem may be exacerbated when one or more dominant data streams overpower weaker multi-path data streams. As used herein, a dominant data stream or a dominant signal path is defined as the data stream or path associated with a dominant mode, a dominant eigenmode, and/or a line-of-sight (LOS) path. For example, a large singular value spread or a large amplitude difference between the data streams in the received composite signal (e.g., due to a dominant LOS data stream) may cause some of the weaker data streams to end up with low SNRs. In response, the receiver may try to optimize the throughput by requesting a lower rank transmission (i.e., to reduce the number of data streams) to avoid wasting power on data streams where little to no throughput is expected, and by requesting a power increase for the data streams where the SNR gain will translate into improved throughput.

Requesting a power increase, however, can exacerbate noise conditions proportional to or dependent on the signal strength, i.e., multiplicative noise, particularly when such noise conditions limit the throughput conditions. Further, the use of fewer data streams leads to lower peak data rates over the wireless connection, which is expected to become even more problematic as standards and technology trend towards transmitters and receivers capable of handling larger numbers of signal streams. For example, both LTE release 10 and IEEE 802.11 ac have recently standardized up to 8×8 MIMO transmissions. Thus, there remains a need for improving MIMO throughput conditions limited by multiplicative noise.

SUMMARY

The method and apparatus disclosed herein improve throughput conditions limited by multiplicative noise by distributing a transmission power across MIMO data streams communicated between MIMO communication nodes. As used herein, the term multiplicative noise refers to any noise dependent on or proportional to the signal strength at a transmitting node and/or a receiving node in a wireless communication network. Also as used herein, a dominant signal path comprises any path associated with a data stream that overpowers other data streams, and includes but is not limited to a path (or data stream) associated with a dominant mode, a dominant eigenmode, and/or a LOS signal path.

An exemplary method comprises determining that multiplicative noise limits the throughput conditions, and distributing a transmission power across one or more data streams communicated between the MIMO transmitter and the MIMO receiver. In particular, the transmission power is distributed based on knowledge at the transmitter of the MIMO channel to decrease the transmission power allocated to one or more of the data streams associated with a dominant signal path relative to the transmission power allocated to one or more data streams associated with a weaker signal path. Such a distribution will increase at least one of a quality and a throughput condition of the MIMO channel.

An exemplary MIMO transmission node comprises an antenna array, a noise processor, and a power distribution unit. The antenna array comprises a plurality of antennas. The noise processor is configured to determine that multiplicative noise limits the throughput conditions. The power distribution unit is configured to distribute a transmission power across one or more data streams transmitted by the antennas. The power distribution is based on knowledge at the transmitter of the MIMO channel to decrease the transmission power allocated to one or more of the data streams associated with a dominant signal path relative to the transmission power allocated to one or more of the data streams associated with a weaker signal path. Such a distribution will increase at least one of a quality and a throughput condition of the MIMO channel.

DETAILED DESCRIPTION

The methods and apparatuses disclosed herein improve the achievable MIMO throughput in conditions where the MIMO throughput is limited by multiplicative noise, e.g., phase noise or quantization errors in the equipment, rather than by additive noise, e.g., thermal noise or interference. To that end, transmission power is distributed across the data streams when multiplicative noise limits the throughput conditions to decrease the transmission power allocated to one or more of the data streams associated with a dominant signal path relative to the transmission power allocated to one or more data streams associated with a weaker signal path. Such a distribution will increase a quality and/or a throughput condition of the MIMO channel. Distributing the transmission power in this manner provides substantial improvements relative to when the transmission power is distributed equally across each data stream.

The following describes the invention in terms of a line of sight (LOS) signal path. It will be appreciated, however, that the present invention is applicable for MIMO conditions having any type of dominant signal paths, including but not limited to one or more paths or data streams associated with a dominant mode, a dominant eigenmode, and/or a LOS signal path. Before discussing this further, the following first provides details regarding MIMO communication systems and the associated problems.

Figure 1:
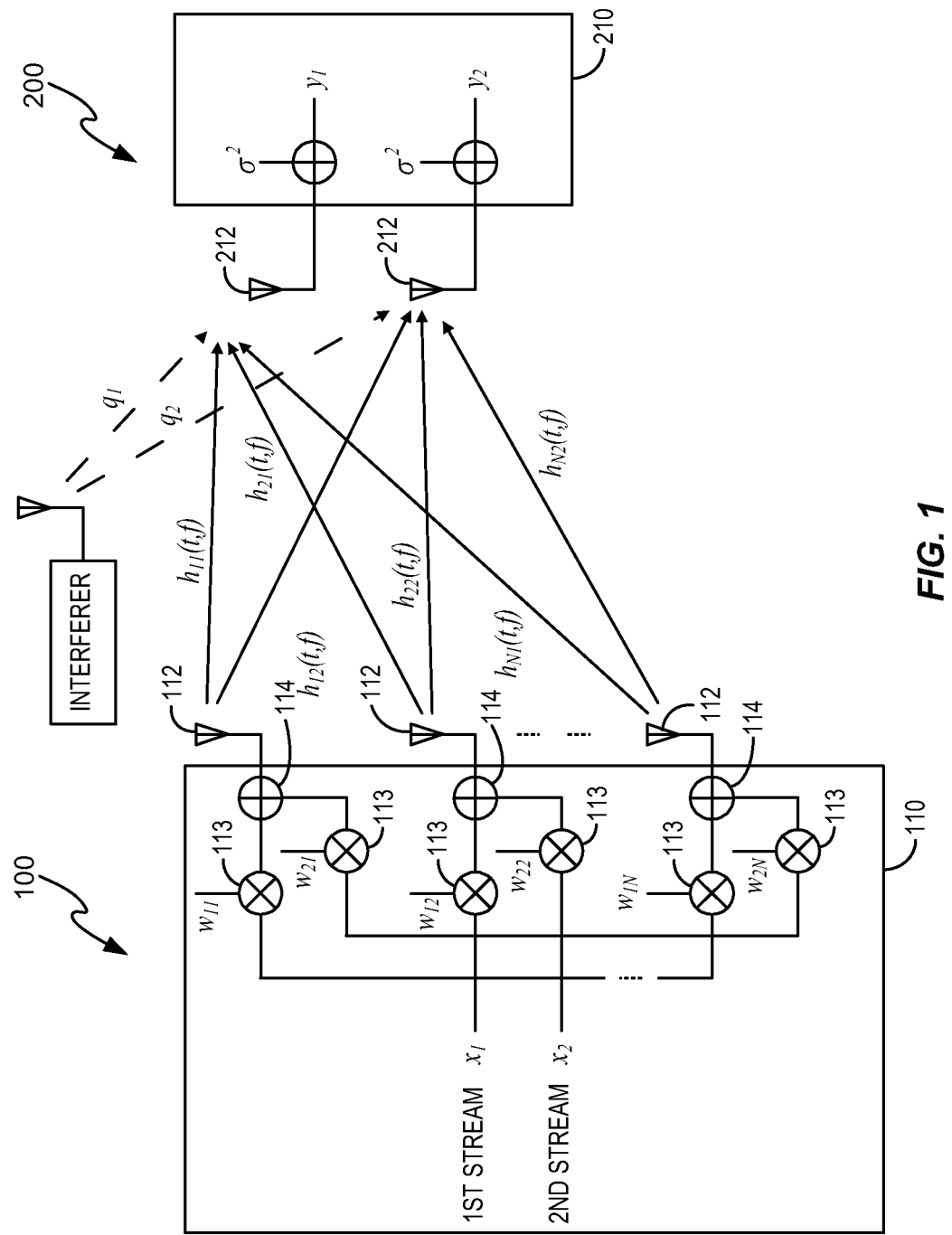
FIG. 1 shows a block diagram of an exemplary MIMO communication system.

FIG. 1 shows a block diagram of a MIMO communication system comprising two MIMO communication nodes, e.g., a transmitter node 100 and a receiver node 200. It will be appreciated that each MIMO communication node 100, 200 may comprise any one of a pico site, a radio base station (including a NodeB and an eNodeB), an access point, a relay, a wireless backhaul node, a user equipment or other wireless device, or any node within the wireless network capable of transmitting and receiving signals. Each MIMO communication node 100, 200 comprises an antenna array 110, 210 having multiple antennas 112, 212. Each of the N antennas 112 of the transmitter node 100 is associated a multiplier 113 and a combiner 114. Each multiplier 113 applies a weight (pre-coder) to one of the B input data streams $x_b$, and the combiner 114 combines the weighted data streams to generate a composite signal for transmission from the corresponding antenna 112. In the example of FIG. 1, B=2 for simplicity. It will be appreciated, however, that any number of data streams up to B=N may be used.

More particularly, multipliers 113 apply a first column vector of weights $w_1 = [w_{11}; w_{12}; w_{13}; \ldots; w_{1N}]$, which may be frequency dependent, to a first data stream $x_1$ for transmission from antenna array 110. Different combinations of weights correspond to different radiation patterns through the antenna array response $a(\theta,\phi) = [a_1; a_2; a_3; \ldots; a_N]$, where:

$$a_n(\theta,\phi) = g_n(\theta,\phi) e^{ik \cdot r_n}. \quad (1)$$

In Equation (1), k represents the wave vector $2\pi/\lambda n$ where n represents a unit vector in the direction $(\theta,\phi)$, $r_n$ represents the antenna displacement vector, and $g_n(\theta,\phi)$ represents the per-element antenna gain vector. While $g_n(\theta,\phi)$ is shown here as a scalar, it will be appreciated that $g_n(\theta,\phi)$ may be generalized to polarized antennas and channels. The shape $G_1(\theta,\phi)$ of the radiation pattern used to transmit data stream $x_1$ becomes:

$$G_1(\theta,\phi) = w_1^T a(\theta,\phi). \quad (2)$$

A second data stream $x_2$ may be transmitted using the same antenna array 110 using the weights $w_2 = [w_{21}, w_{22}, w_{23}, \ldots, w_{2N}]$. In general, up to N data streams can be transmitted simultaneously. The total transmitted signal may be represented by the superposition:

$$Wx = w_1 x_1 + w_2 x_2. \quad (3)$$

The application of weights W ($w_1, w_2$) at the transmitter node 100 is generally referred to as pre-coding.

The receiver node 200 also comprises an antenna array 210 of M antennas 212, where the radio channel between the $n^{th}$ transmitting antenna 112 and the $m^{th}$ receiving antenna 212 may be expressed as $h_{nm}$, where $h_{nm}$ may be time-dependent and/or frequency-dependent. While not shown, the receiver node 200 may also apply different weight vectors to the antenna array 210 for different received signals. In matrix notation, the received signal $y = [y_1, y_2, y_3, \ldots, y_M]$ may be expressed as:

$$y = (I + \Sigma_{rx}) H (I + \Sigma_{tx}) Wx + \Sigma + Q, \quad (4)$$

where the diagonal matrixes $\Sigma_{rx}$ and $\Sigma_{tx}$ represent multiplicative noise, including but not limited to phase noise and quantization errors, H represents a matrix of the channel estimates, $\Sigma$ represents additive noise, including but not limited to thermal noise, and Q represents the interference.

The receiver node 200 is thus tasked with the problem of separating the received composite signal y into the individual data streams $x_1, x_2, \ldots, x_N$ in order to successfully decode each data stream. This problem is generally complex, but it has been shown that in the absence of interference, phase noise, and dynamic range limitations, the optimal pre-coders and receive weight vectors are given by the singular value decomposition (SVD) of the wireless channel. In particular, it has been shown that the receive weight vectors may be given by H=U·S·V, where U represents the unitary pre-coding matrix, V represents the unitary receiver weight matrix, and S represents a diagonal matrix where each diagonal element represents the signal amplitude that a particular mode of communication will experience. Thus, for an M×N channel H, the diagonal matrix S will be of size M×N. In other words, the number of independent channels that can be transmitted over this channel is bound by min (M,N). If the channel H is rank-deficient, then some of the elements of S will be zero, further limiting the available number of data streams. In a noise-limited scenario, the total capacity R of the channel is known to be the sum of the Shannon capacity for each substream, assuming equal and independent noise level $\sigma^2$ over the different receiver radio chains, as given by:

$$R = f_{BW} \sum_{n=1}^{N} \log_2 \left(1 + \frac{p_n s_n^2}{\sigma^2}\right), \quad (5)$$

where $p_n$ represents the power allocated to the $n^{th}$ data stream and $f_{BW}$ represents the bandwidth.

In general, finding and utilizing the SVD requires full channel knowledge at the transmitter node 100, something which is costly to obtain in practical circumstances. In particular, full feedback of all channel coefficients $h_{nm}$ may require a prohibitive amount of reverse link capacity, especially when $h_{nm}$ is time- or frequency variant and the numbers N and/or M are large. Therefore, different lower-complexity schemes have been devised. One such scheme relies on quantized feedback of preferred pre-coders based on a previously agreed codebook, known as closed-loop pre-coding. Closed-loop pre-coding is a part of standards including but not limited to 3GPP UMTS and 3GPP LTE. The closed-loop codebook consists of a finite number of available pre-coding matrixes W for each rank (e.g., for each number of data streams to be transmitted). The receiver node 210 estimates the channel H, typically using reference symbols or pilots transmitted from each of the transmit antennas 112, as well as the noise and interference level, using any known technique. Next, the receiver node 200 evaluates all possible pre-coding matrixes and searches for the one that will result in the best utilization of the available radio resources, which is typically the rank and pre-coder that results in the highest data rate throughput given the estimated SNR or SINR. Once this is found, the receiver node 200 signals the desired rank and pre-coder on the reverse link to the transmitter node 100 to indicate the receiver node's preference, typically using a Rank Indicator (RI) and a pre-coding matrix indicator (PMI). In addition, the receiver node 200 may signal back the perceived channel quality using a Channel Quality Indicator (CQI) that it expects to experience with the selected pre-coder, to allow the transmitter node 100 to adjust the coding and modulation scheme optimally, a process known as link adaptation. The transmitter node 100 may in some cases be required to use the preferred pre-coding indicated by the receiver node 200. In other cases, the transmitter node 100 may override the recommendation at its discretion, e.g., due to circumstances unknown to the receiver node 200, e.g., the existence of additional receivers, scheduling priorities, non-full data buffers, etc. While possible, such an override may obsolete the CQI feedback because was generated based on the receiver's preferred pre-coder, which typically renders link adaptation more challenging.

Another MIMO scheme included in the same wireless communication standards is the so-called open-loop pre-coding. In this scheme, no channel or preferred pre-coder information is fed back to the transmitter node 100, although CQI and rank feedback are still used. Instead, the transmitter node 100 will typically send information with a fixed pre-coder or a pre-coder that cyclically varies in time and/or frequency. Additionally, when multiple data streams are transmitted, the pre-coders are usually mixed in order to provide the same channel quality for all data streams. Open-loop pre-coding is suboptimal compared to closed-loop pre-coding. At high signal to noise ratios, however, the difference between the two diminishes. In particular, the closed-loop scheme will essentially find good pre-coders that result in good data stream separation and high per-stream SNRs at the receiver node 200, while the open-loop scheme instead relies on a high likelihood of using sufficiently good pre-coders and the ability of the receiver node 200 to separate the streams. The closed-loop scheme is sensitive to noisy channel estimates, which might result in non-optimal pre-coders. Also the reported pre-coder might be outdated by the time the transmitter node 100 uses it for the actual transmission. The open-loop scheme, on the other hand, relies on diversity and uses a wide range of different pre-coders. Thus, the open-loop scheme will not be optimal, but it is less sensitive to noise and timing issues. Regardless of whether the system uses a closed-loop or open-loop pre-coding scheme, the receiver node 200 processes the received composite signal to decode each of the data streams. Because the channel will typically mix the data streams, as is evident from Equation (4), signal processing is required to separate the data streams. Many different MIMO receiver structures are known in the art. Broadly, these fall in to two categories: linear receivers and non-linear receivers. The operation of a linear receiver may be expressed by a linear operator operating on the received signal vector y according to $\hat{x}=Py$, where P represents the receiver weight matrix. An example of a linear receiver is the minimum mean square error (MMSE) receiver, which selects weights P such that the mean square error between the transmitted and the estimated symbols is minimized in the presence of additive noise and interference. The MMSE receiver is equivalent to a zero-forcing receiver in the case where no noise or interference exists. The operation of a non-linear receiver relies on the use of more complex operations, e.g., multi-stage operations. An example of a non-linear receiver is the Maximum Likelihood (ML) receiver or the Successive Interference Cancellation (SIC) receiver.

The ability of receiver node 200 to separate the data streams depends on the orthogonality between the data stream channels. In general, the separation will be non-perfect, leading to inter-stream interference that limits the achievable SINR for each stream. The more the data stream channels resemble each other, the more difficult the separation will be, leading to lower effective SINRs on each sub-stream. Channel similarity is often expressed by the cross correlation, though an alternative measure is the singular value spread. The cross correlation coefficient of two channel coefficients $h_1$ and $h_2$, for example, may be defined by:

$$\rho_{12} = \frac{E\{h_1 h_2^*\}}{\sqrt{E\{h_1 h_1^*\} E\{h_2 h_2^*\}}}, \tag{6}$$

and is typically estimated by the sample cross correlation:

$$r_{12} = \frac{\sum_{k=1}^{K} \tilde{h}_1(k) \tilde{h}_2^*(k)}{\sqrt{\sum_{k=1}^{K} \tilde{h}_1(k) \tilde{h}_1^*(k) \sum_{k=1}^{K} \tilde{h}_2(k) \tilde{h}_2^*(k)}}, \tag{7}$$

where $\tilde{h}_1(k)$ and $\tilde{h}_2(k)$ represent sequences of (typically noisy) channel estimates of the channels $h_1$ and $h_2$. The singular value spread is derived from the singular value matrix S (derived from the channel H). A simple measure of this spread is the ratio of the largest and the smallest singular value, e.g., $$\frac{s_{max}}{s_{min}}.$$

Large correlations between the elements of the channel matrix H implies a large singular value spread and hence a difficult receiver problem.

In the case that multiple streams are transmitted, the power per data stream will be lower than if fewer or a single data stream is transmitted. Successful link adaptation thus requires finding the optimal number of data streams to transmit, and also the power to use for each data stream. This optimum will be SNR-dependent. At low SNRs it is typically better to allocate all power to one data stream, while at higher SNRs the available transmit power may be equally shared across data streams while still maintaining a sufficiently high per-stream SNR to allow a high order of modulation and coding. It has been shown that an optimal per-stream power allocation, in the absence of interference, phase noise, and dynamic range limitations, is given by a "water filling" solution in which power is allocated proportional to the per-stream SNR, but only to those streams that have an SNR exceeding a certain threshold. However existing cellular standards tend to share transmit power equally across the data streams. As seen in Equation (5), data streams with poor conditions (weaker $s_n$) will not contribute as much to the total throughput as data streams with good conditions (strong $s_n$) due to the $\log_2$ expression. The best conditions for MIMO communications thus occur when the SNR or SINR is high and the wireless channel experiences rich scattering, e.g., low correlation or a small singular value spread.

In cellular communication systems, where multiple transmitters and receivers in different cells (or even the same cell) re-use the same radio resources, e.g., time slots and/or frequency bands, there will be interference between the transmissions. In addition, the further the receiver node 200 is from the transmitter node 100, and the more obstacles in between that block the direct radio path, the weaker the received signal will be. Thus, the signal levels tend to be highest when there is line of sight (LOS) path between the desired transmitter-receiver pair, and no LOS path for the interfering transmitters.

Figure 2:
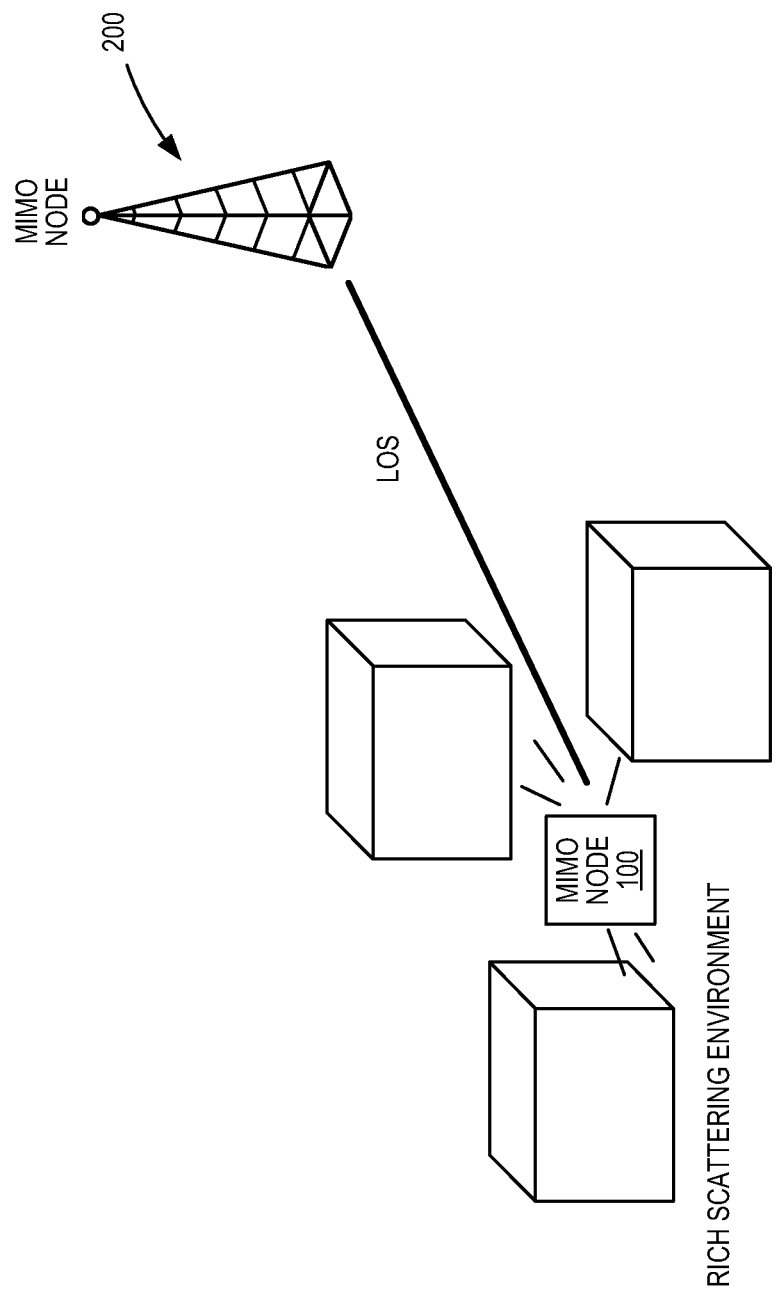
FIG. 2 shows an exemplary rich scattering environment.

However, the channel gain of the data stream utilizing the LOS path and the others differ substantially as the scattered paths are much weaker, as shown in FIG. 2. In order to utilize the scattered paths in combination with the strong LOS path, the receiver node 200 needs a very large dynamic range (on the order of 50-60 dB), which in most practical cases is not possible. The beneficial channel conditions for MIMO are thus to some extent mutually exclusive, because the highest SNR or SINR conditions occur at the same time as the lowest experienced channel richness, and vice versa. It is possible to utilize antenna polarization to maintain good sub-channel isolation even in the presence of a dominant LOS path signal, e.g. by transmitting and receiving streams with orthogonally polarized antennas. However, this ability is restricted to the two polarizations possible for a plane wave.

In addition, various transmitter and receiver impairments will further exacerbate the problems of channel richness and of inter-stream interference. For example, non-linearities in the transmitter node 100 may cause a power-dependent error floor of the transmitted symbols. This error is commonly characterized by the Error Vector Magnitude (EVM), which is defined as the error of a complex modulation symbol divided by the amplitude of that symbol. Typical sources of EVM include thermal and phase noise, the dynamic range of the Digital-to-Analog (D/A) converter, quantization errors in the digital representation of the transmitted signals, and saturation or clipping in the power amplifiers. Similarly, the receiver node 200 may also suffer from various impairments that can be characterized by a receiver EVM. The EVM in the transmitter node 100 and/or receiver node 200 may be reduced by using more expensive, high quality components and complex circuitry. However, the cost-benefit trade-off in commercial and mass-market communication equipment usually leads to EVM values of at best around 3% or −30 dB. As a result, the SNR that the receiver experiences on its channel estimates will be upper limited by ~30 dB. A large singular value spread or data stream amplitude spread will cause some of the weaker of the potential MIMO data streams to end up with low or negative (in dB) estimated SNRs. As the receiver node 200 tries to optimize the throughput it will most likely request a lower rank transmission to avoid wasting power on streams where little or no throughput is expected, and instead increase the power of the stronger data streams where the SNR gain will translate into a larger throughput gain. The fact that the channel estimates for the weaker data streams will be noisier also has consequences for the capabilities of the MIMO receiver node 200 to suppress the inter-stream interference, which further discourages the use of many streams.

Figure 3:
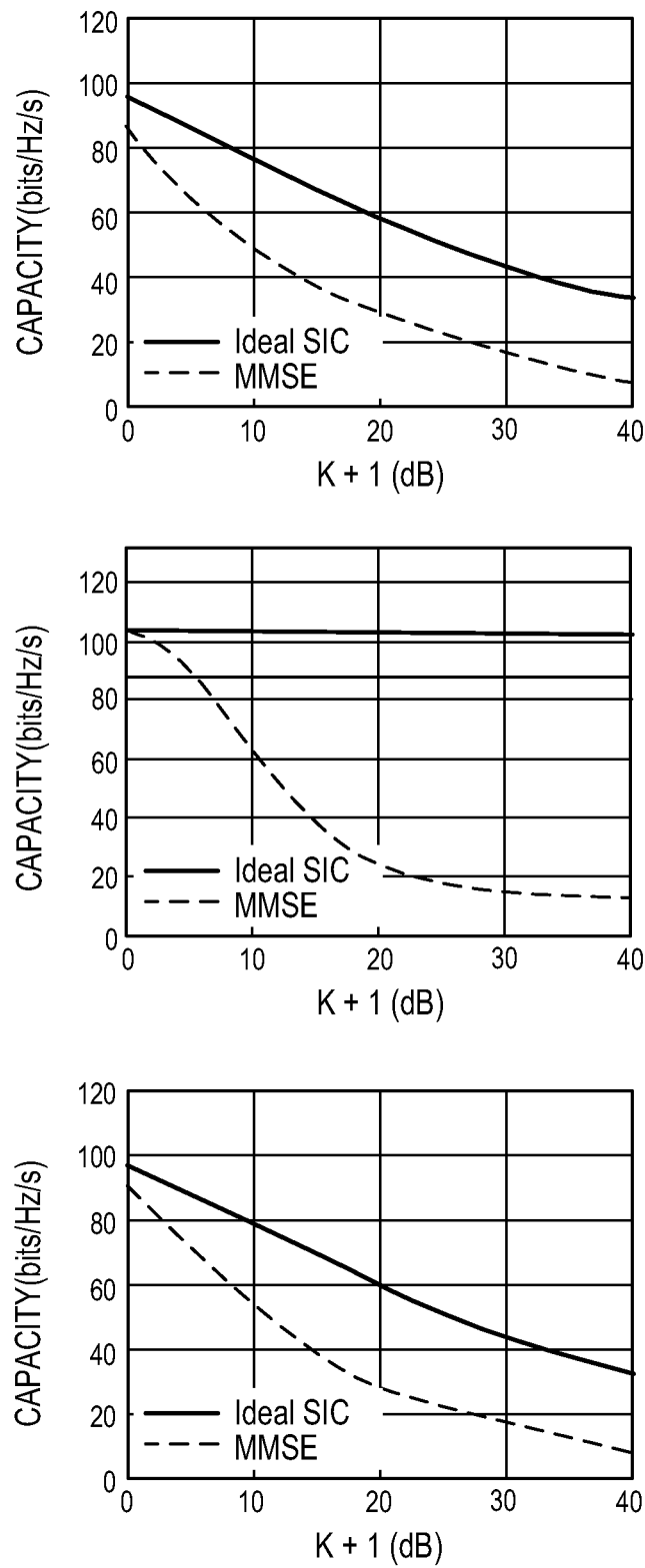
FIG. 3 shows the effect of multiplicative noise in a MIMO communication system.

FIG. 3 shows the effect of multiplicative noise (e.g., noise that depends on signal strength, e.g., phase noise) at the level of −30 dB when equal power is allocated to all data streams. FIG. 3A applies when only the receiver node 200 is multiplicative noise limited. FIG. 3B applies when only the transmitter node 100 is multiplicative noise limited. FIG. 3C applies when the transmitter node 100 and the receiver node 200 are equally multiplicative noise limited. A performance degradation of 50% or more will occur when the Ricean K value (i.e., the ratio of the power in the LOS path to the power in the non-LOS paths) is larger than 10 dB and 25 dB for an MMSE receiver and an ideal successive interference cancellation (SIC) receiver, respectively. This level of degradation is likely to occur in real networks that use higher order MIMO transmission schemes, as K values at the order of 10 dB or larger are likely due to LOS conditions. It should be noted that the additive noise in this case is well below the multiplicative noise, and thus the throughput is limited by the multiplicative nose. Moreover, for the case where the multiplicative noise occurs only in the transmitter node 100, no degradation is observed for an ideal SIC receiver.

The use of fewer MIMO data streams leads to lower peak data rates over the wireless connection, because the data rate per data stream is typically limited by the highest modulation and coding scheme for which equipment and standard is prepared for. This effect has been observed in deployed systems, typically in situations where there LOS conditions exist between the transmitter node 100 and receiver node 200. The degradation can be quite large; the throughput can drop by a factor of 2 or even 3 compared to non-LOS (NLOS) conditions. Examples include situations where the terminal passes into a LOS path at a street corner; thus, the effect can be very rapid. The problem increases the higher the number of transmit and receive antennas there are in the MIMO link. As both LTE release 10 and IEEE 802.11ac have recently standardized up to 8×8 MIMO configurations, the problem is expected to become even more evident as 8-antenna products become available.

Figure 4:
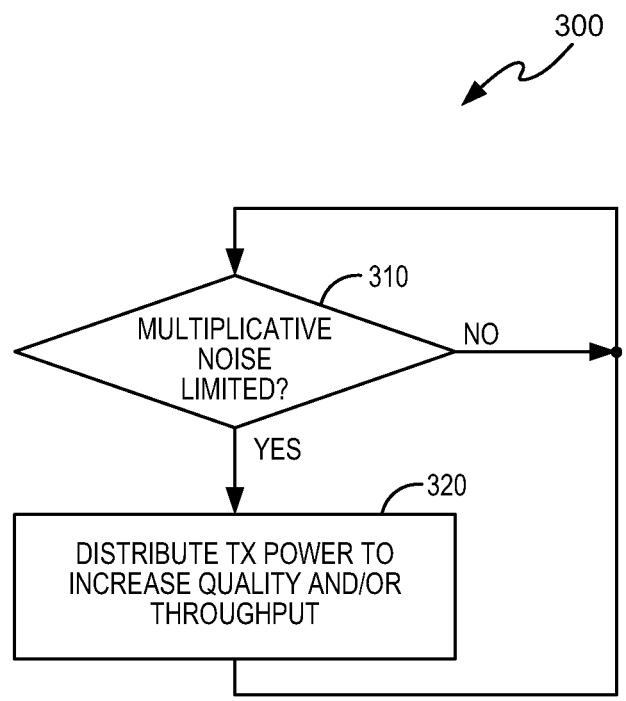
FIG. 4 shows a method for improving throughput conditions according to one exemplary embodiment.

FIG. 4 shows an exemplary method 300 that may be used to improve throughput conditions between a MIMO transmitter node 100 and a MIMO receiver node 200 when the MIMO throughput is limited by multiplicative noise. When it is determined that the throughput is limited by multiplicative noise (block 310), the transmission power is distributed across one or more data streams. The distribution is configured to decrease the transmission power of the LOS data streams relative to the transmission power of the non-LOS data streams, and therefore, to increase the quality and/or throughput condition of the MIMO channel (block 320). Distributing the transmission power in this manner prevents the weaker NLOS data streams from being hidden by the dominant LOS data streams, avoiding impairment in data streams corresponding to the weaker signal paths that would otherwise be caused by data streams associated with the dominant signal paths in a multiplicative noise limited scenario.

Figure 5:
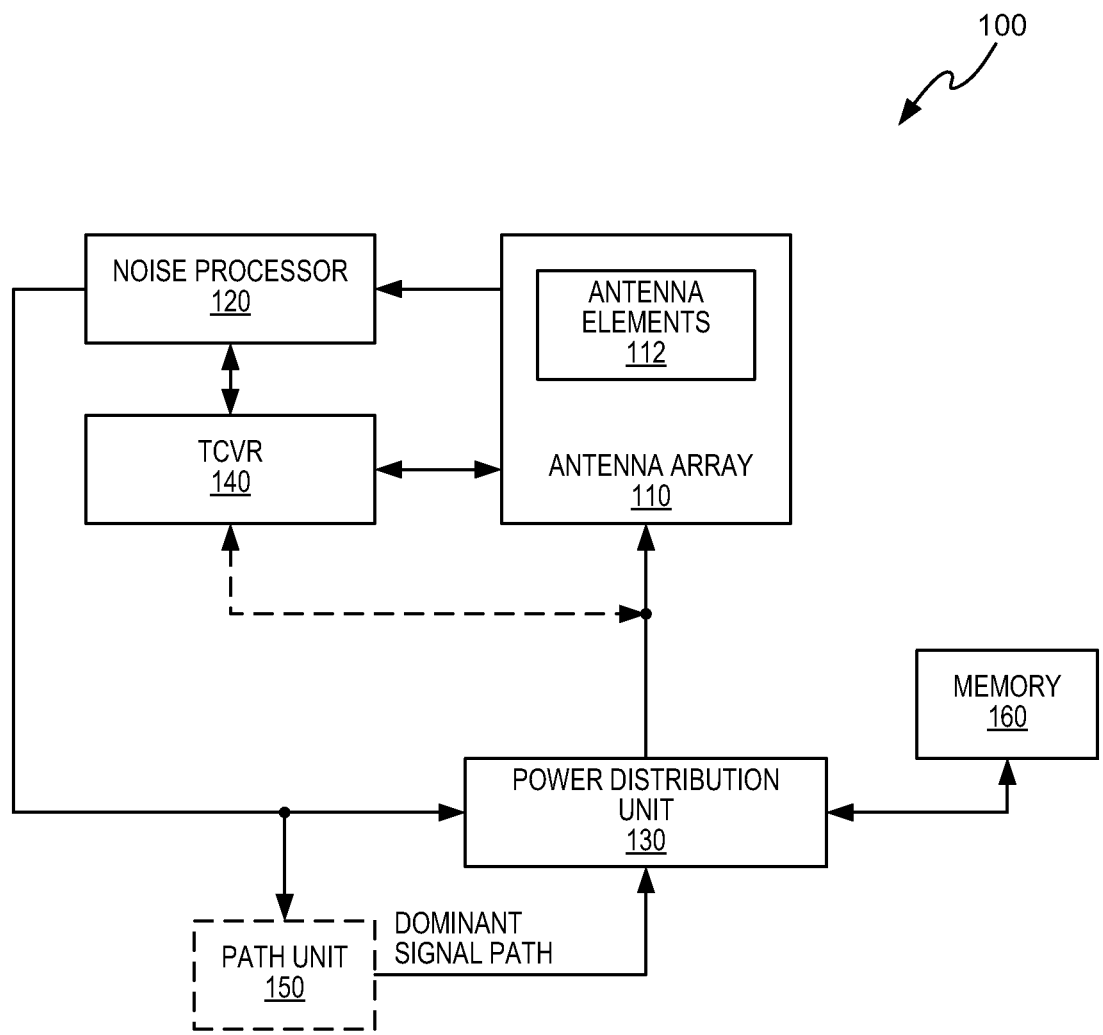
FIG. 5 shows a block diagram of an exemplary transmitter node in the MIMO communication system.

FIG. 5 shows an exemplary MIMO transmitter node 100 configured to implement the method of FIG. 4. In addition to the antenna array 110 shown in FIG. 1, MIMO transmitter node 100 comprises a noise processor 120, power distribution unit 130, a transceiver 140, an optional path unit 150, and memory 160. Noise processor 120 is configured to determine whether multiplicative noise limits the MIMO throughput conditions. Power distribution unit 130 is configured to distribute the transmission power across one or more of the data streams to increase the quality and/or throughput condition of the MIMO channel. Memory 160 is configured to store any information useful for operation of the node 100.

The power distribution disclosed herein is implemented based on partial or complete knowledge, at the transmitter node 100, of the MIMO channel. Such channel information may comprise direct channel information, or may comprise indirect channel information, e.g., information about the pre-coder vectors corresponding to the significantly strongest channel eigenvalues. In any event, the transmitter node 100 uses the channel knowledge to distribute the transmit power, in an optimal or a nearly optimal way, over the data streams. As a result, the power distribution disclosed herein relies on accurate knowledge at the transmitter about the MIMO channel. Sufficient accuracy may be achieved by:
1. Averaging received channel sounding reference signals.
2. Equalizing the received power by adjusting the transmitted power of each of the data streams corresponding to the MIMO channel eigenvalues.

It will be appreciated that the power distribution disclosed herein may be used for any known communication standard.

When additive noise limits the throughput conditions instead of multiplicative noise, conventional power distributions may distribute the transmission power across all data streams using a waterfilling technique. For the case when additive noise limits the throughput conditions and there is a high SNR, an equal power distribution is close to optimal. When multiplicative noise limits the throughput conditions, however, the waterfilling distribution of the transmission power is not optimal, as shown by the "Equal Power" curves in FIGS. 6 and 7. In particular, there is a significant loss in capacity for large K values for such equal power scenarios. To facilitate the description of the disclosed power distribution, the following first provides a simple channel model for a MIMO system of 8×8 antennas experiencing a corresponding radio channel $H_{ij}$. It will be appreciated that this model is used for illustrative purposes, and is not intended to be limiting.

The proposed method distributes the transmission power across the data streams in a non-equal fashion when multiplicative noise limits the throughput conditions. For example, the optimal antenna pre-coding weight vectors are given by the ideal singular value decomposition of the wireless channel according to:

$$U^H H V = \Sigma, \quad (8)$$

where U and V represent unitary matrixes and Σ represents a real valued positive semi-definite diagonal matrix. Introducing diagonal phase noise (an example of multiplicative noise) matrixes $\Pi_{TX}$ and $\Pi_{RX}$ produces:

$$U^H (1+\Pi_{TX}) H (1+\Pi_{RX}) V = \Sigma + X \quad (9)$$

where X represents a term corresponding to noise and crosstalk between the MIMO channels. The model assumes an independent and identically distributed white Gaussian channel with unit mean power $H_{GAUSS}$ for the case when the Ricean K is zero. For K>0, a corresponding constant matrix is added according to:

$$H = H_{GAUSS} + \sqrt{K} \begin{pmatrix} 1 & 1 \\ -1 & 1 \end{pmatrix}, \quad (10)$$

where I represents a 2×2 identity matrix. This channel corresponds to an ideal LOS condition with 4×4 double polarized antennas having +45/−45 degrees linear and V/H polarizations in the transmitter node 100 and the receiver node 200, respectively.

The phase noise is assumed to be independent and identically distributed Gaussian in each end. Defining a matrix M by:

$$M = |U^H \cdot H|^2 \cdot \langle |\Pi_{TX}|^2 \rangle \cdot |V|^2 + |U^H|^2 \cdot \langle |\Pi_{RX}|^2 \rangle \cdot |H \cdot V|^2, \quad (11)$$

which accounts for the multiplicative noise in the Shannon capacity expression gives:

$$C = \sum_{i=1}^{N} \log_2 \left( 1 + \frac{|\Sigma_{ii}|^2 P_i}{[M \cdot P]_i + \sigma^2} \right), \quad (12)$$

where C represents the Shannon mutual information of the MIMO channel, $P_i$ represents the transmitted power on eigenvalue substream i, and $\sigma^2$ represents the additive noise power. The optimal transmit power allocation to the different data streams is then given by:

$$P = \arg \max(C), \quad (13)$$

where P represents the transmit power allocation vector that maximizes the Shannon mutual information. While there is no closed-form solution for Equation (13), various methodologies exist for determining the transmit power allocation vector. For example, a gradient based method may be used and has been shown to solve the problem efficiently. Alternatively, a look-up table may be created, where the look-up table comprises predefined pre-coders, where different pre-coder weights may include different power allocations for different data streams. In this case, the look-up table is searched to find the best solution. The design of this look-up table can be based on Equation (13).

The proposed method relies on the transmitter node 100 having knowledge of the additive noise $\sigma^2$ and multiplicative noise $\Pi_{TX}$ and $\Pi_{RX}$. In some cases, these parameters are well specified for the transmitter node 100 and the receiver node 200, e.g., by noise figure and phase noise. The parameters could also be determined by separate calibration measurements or online SNR estimation for different levels of received signal strength, as discussed further herein and described in detail in U.S. patent application Ser. No. 13/714, 613, which is incorporated herein by reference. Once the transmitter node 100 obtains $\sigma^2$, $\Pi_{TX}$, and $\Pi_{RX}$, M may be determined according to Equation (11), which in turn is used to maximize C to determine the power allocation p over all channel eigenvalues, freely or in groups of strong and weak eigenvalues.

The multiplicative noise $\Pi_{TX}$ and $\Pi_{RX}$ may not be white Gaussian distributed in complex amplitude, e.g. in the case when phase noise is dominating. For SISO transmission the Shannon mutual information given by Equation (12) is not valid when the phase noise dominates. In the MIMO case, however, all data streams are interfering (by Equation (11)), and the resulting noise per data stream is close to complex white Gaussian distributed.

Figure 8:
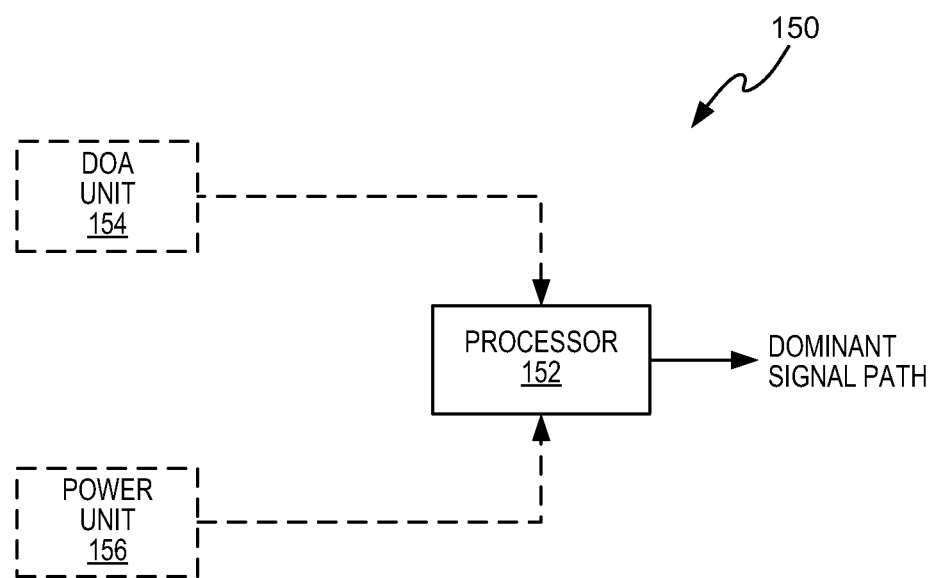
FIG. 8 shows a block diagram of a path unit according to one exemplary embodiment.

Referring again to FIG. 5, to facilitate the power distribution operations, MIMO node 100, 200 may further include a path unit 150 configured to identify the LOS path between the transmitter node 100 and the receiver node 200. In one exemplary embodiment, path unit 150 identifies the LOS path based on dominant signal path information received from a remote node, e.g., the receiver node 200 or another remote network node. In another embodiment, an exemplary path unit 150 comprises a processor 152 and an optional direction of arrival (DOA) unit 154, as shown in FIG. 8. DOA unit 154 is configured to estimate a DOA for each of two or more received signals received by transceiver 140 based on reference signals included in the received signals. For example, the DOA may be determined in the digital domain by processing the received cell-specific reference signals or channel state information reference signals. Processor 152 is configured to identify the LOS path based on the estimated DOAs.

According to another exemplary embodiment, path unit 150 includes an optional power unit 156 and the processor 152, where the power unit 156 is configured to determine a power associated with each of the antennas 112, 212. The processor 152 is configured to identify the LOS path based on a relative comparison between the determined powers. For example, for wireless links having throughput conditions limited by multiplicative noise, it is of interest to know which of the B data streams or pre-coders gives the highest received power, because it is the power and multiplicative noise associated with this data stream that causes the degradation for the weaker data streams. In some situations, such as for an LOS link with co-polarized antennas, there might be a single dominating path corresponding to one dominant pre-coder and data stream. In other situations, there might be two or more dominant paths/data streams of similar power, e.g., in a LOS link with dual-polarized antennas.

The power unit 156 may determine the power per data stream according to:

$$P_j = |H \cdot w_j|^2, \quad (14)$$

where $w_j$ represents the $j^{th}$ pre-coder vector of weights. This power may be determined for all possible pre-coder vectors, or for only those pre-coder vectors that correspond to the preferred or recommended pre-coder vectors (the number depending on the preferred or recommended rank). A MIMO node 100, 200 with limited channel state information, e.g., the transmitter node 100 in an FDD system, may instead utilize PMI and CQI feedback to determine dominating pre-coders. In some cases, CQI values are coupled directly to corresponding pre-coders, while in other cases one CQI value is coupled to a codeword that is mapped to multiple data streams. The CQI value, which is indicative of the estimated SNR (or power), may therefore uniquely identify one pre-coder, or it may identify the sum of two or more pre-coders. Either case provides beneficial information. Finally, a MIMO node 100, 200 with limited channel state information, e.g., a transmitter node 100 in an FDD system, may also utilize second order channel statistics measured on the reverse link, such as antenna correlations or direction estimation via various methods as known in the art, in order to determine which direction or pre-coder will give the highest received power in the receiver node 200.

As discussed herein, the transmission power is intelligently distributed across one or more data streams when multiplicative noise limits the throughput conditions, i.e., when the noise proportional to or dependent on the received (or transmitted) signal power experienced by the receiver node 200 on, e.g., its channel estimates, dominates. Thus, under such conditions, reducing the received/transmitted signal power corresponding to the strongest signal paths (e.g., the strongest channel eigenvalues) while maintaining and/or increasing the power corresponding to the weaker signal paths (e.g., weaker channel eigenvalues) effectively results in significantly reduced multiplicative noise in the weaker signal paths due to cross-talk from the strongest signal paths, which in turn improves the per-data-stream SNR/SINR and subsequently the throughput over the wireless MIMO channel. If, on the other hand, the thermal noise and interference is stronger than the multiplicative noise then no such improvements are possible because any reduction in the transmitted signal power will only degrade the SNR or SINR levels for all data streams.

Because the power distribution disclosed herein depends on the knowledge of whether multiplicative noise limits throughput conditions, it is also beneficial to provide methods and apparatuses to detect when multiplicative noise limits the throughput. Multiplicative noise $N_\pi$ limits the throughput conditions when:

$$\frac{1}{N_\pi} \leq \frac{P_{sig}}{\sigma^2 + I}, \quad (15)$$

where $P_{sig}$ represents the signal power, $\sigma^2$ represents the thermal noise power, and I represents the interference power. The multiplicative noise $N_\pi$ may be expressed as a combination of the multiplicative noise at the transmitter node 100 $\langle \Sigma_{tx}^2 \rangle$ and the multiplicative noise at the receiver node 200 $\langle \Sigma_{rx}^2 \rangle$ according to:

$$N_\pi = \langle \Sigma_{tx}^2 \rangle + \langle \Sigma_{rx}^2 \rangle. \quad (16)$$

The determination of whether multiplicative noise limits the throughput conditions may be made in the transmitter node 100, or in a network node remote from the transmitter node 100 that subsequently sends a quantitative or qualitative multiplicative noise evaluation to the transmitter node 100.

Figure 9:
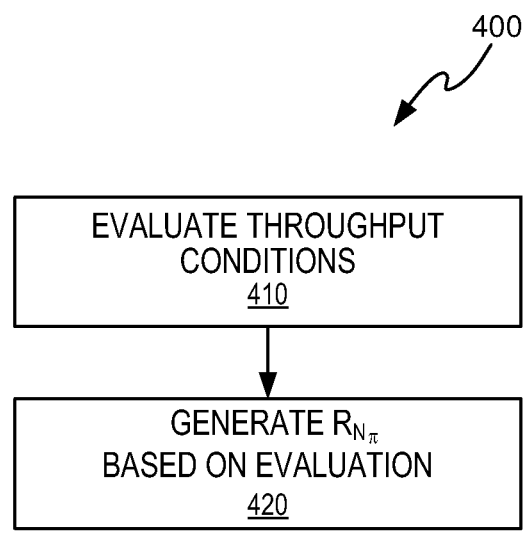
FIG. 9 shows a method of determining whether multiplicative noise limits throughput conditions according to an exemplary embodiment.
Figure 10:
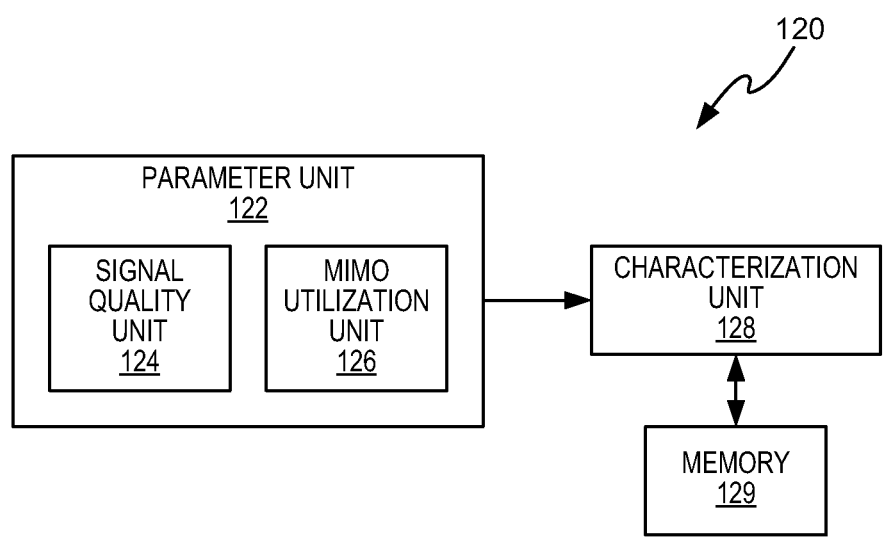
FIG. 10 shows a block diagram of a noise processor according to an exemplary embodiment.

FIG. 9 shows an exemplary method 400 for determining whether multiplicative noise limits throughput conditions as executed by a noise processor 120 comprising a parameter unit 122 and a characterization unit 128, as shown in FIG. 10. It will be appreciated that the noise processor 120 may be part of the transmitter node 100, the receiver node 200, or another node within the wireless network.

Parameter unit 122 evaluates the throughput conditions based on a signal quality parameter and/or a MIMO utilization parameter (block 410). Characterization unit 128 generates a multiplicative noise evaluation $R_{N_\pi}$ characterizing the MIMO throughput conditions based on the evaluated throughput conditions (block 420). In some embodiments, the multiplicative noise evaluation may comprise qualitative information, e.g., a simple "yes" or "no" indication. In other embodiments, the multiplicative noise evaluation may comprise quantitative information providing a qualitative assessment of the multiplicative noise, e.g., how much the multiplicative noise dominates the additive noise.

The following discloses the results of simulations used to demonstrate the effectiveness of the power distribution disclosed herein. More particularly, as shown in FIG. 3 the MIMO performance of standard receivers (like MMSE and SIC) is degraded when the multiplicative noise is dominating in LOS conditions (LOS conditions implies large spread of channel eigenvalues). However by distributing the transmitted power in a clever way across the data streams (e.g., across the pre-coder matrix which corresponds to the channel eigenvalues), it is possible to substantially improve the performance. The drawback with this approach is that accurate information of this specific pre-coder has to be available at the transmitter. In case of TDD, however, this information need not be fed back due to channel reciprocity. Moreover, for the nearly optimal solution the full PM information is not needed, only the information about the pre-coder vectors which correspond to the strongest eigenvalues (e.g. the LOS direction).

Figure 6:
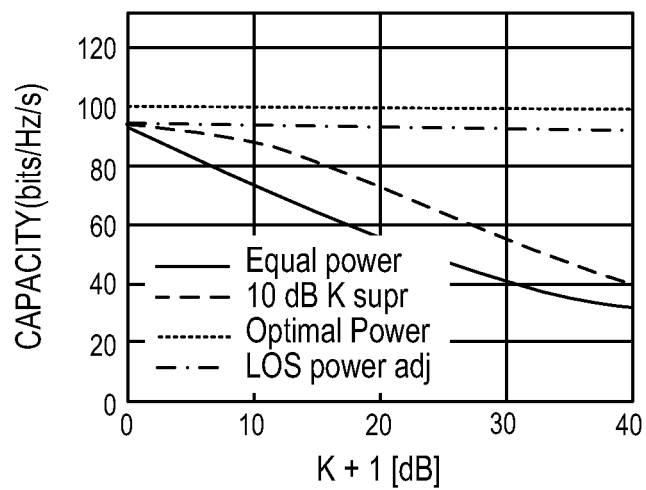
FIGS. 6 and 7 show the effects of intelligent power distribution.
Figure 6:
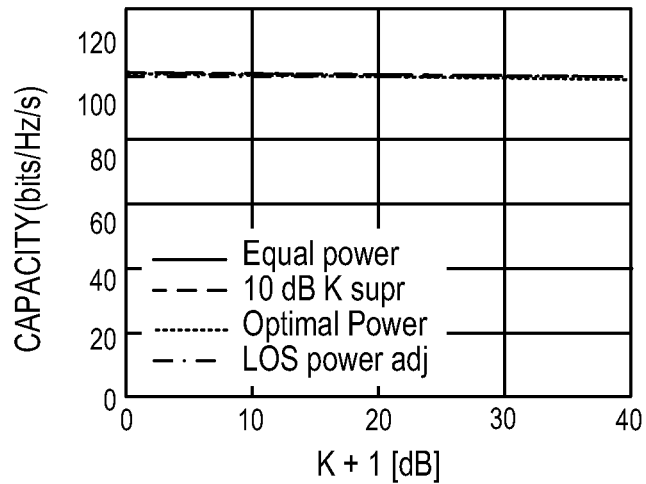
Figure 6:
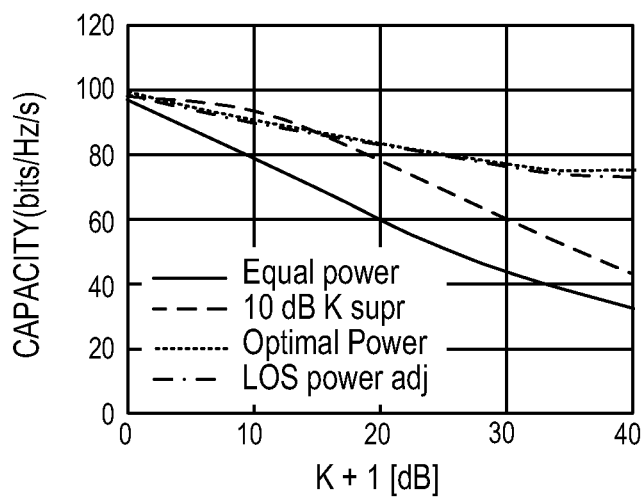

FIG. 6 shows the effect of distributing the power differently over the transmitter pre-coding weight vectors corresponding to the MIMO channel singular values for an ideal SIC receiver (or ideal SVD transmission) for four different distribution methods:
1. Equal power on all steering vectors (e.g., according to current 3GPP LTE releases);
2. Maximization of throughput with respect to reduction of power allocated to data streams corresponding to the strongest signal paths (e.g. corresponding to the LOS);
3. Optimal allocation of power to all data streams to reduce the power allocated to the strongest signal paths while increasing the power allocated to the weaker signal paths (e.g. the power allocation which maximizes the throughput); and
4. Change of channel characteristics by other means resulting in reduction of Ricean K, e.g. reconfiguration of antennas, as described in co-pending U.S. application Ser. No. 13/714,613, filed concurrently herewith.

If the multiplicative noise dominates in either the transmitter node 100 or the receiver node 200 only, it is possible to maintain the capacity of K=0 even for very high K values by using the optimal power allocation. In fact, nearly maximal capacity may be achieved if the power allocated to the data stream corresponding to the LOS is adjusted. If the multiplicative noise dominates in both the transmitter node 100 and the receiver node 200, however, it is not possible to maintain the capacity of K=0 for the higher K values.

Figure 7:
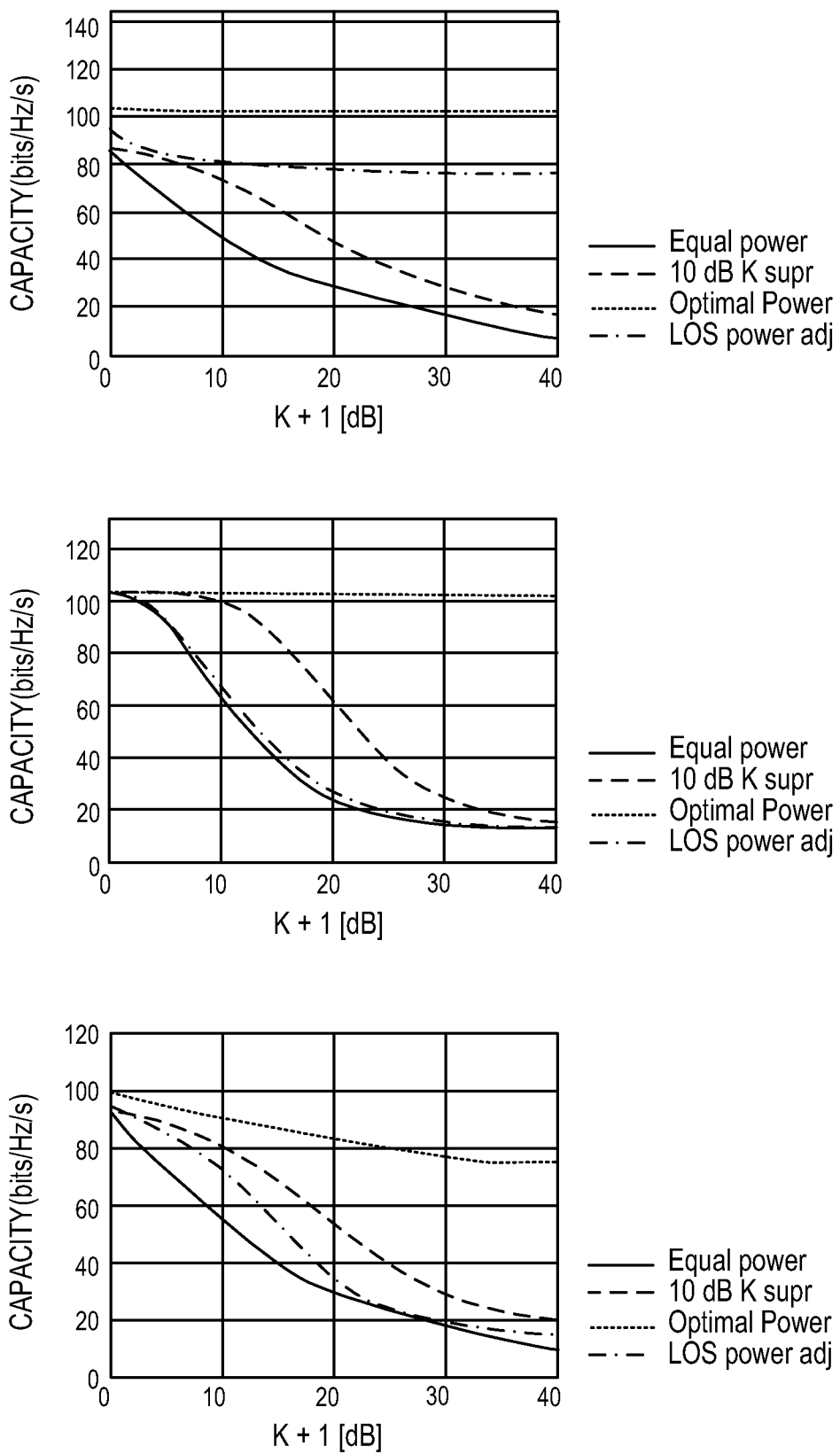

FIG. 7 shows the effect of distributing the power differently over the pre-coding weight vectors of the transmitter node 100 corresponding to the MIMO channel singular values for an MMSE receiver. In this example, the optimal power allocation (distribution method 3) is not determined, but the curves for optimal power allocation for the ideal SIC receiver are shown as a maximum capacity reference case.

For the MMSE receiver it is possible to almost maintain the capacity of K=0 even for very high K values if the multiplicative noise dominates in the receiver node 200 only. In this case, distribution method 2 is applied, e.g., the power allocated to the data stream corresponding to the LOS path is adjusted to maximize the Shannon mutual information given by Equation (12). If the multiplicative noise dominates in the transmitter node 100, or in both the transmitter node 100 and the receiver node 200, the power distribution techniques disclosed herein still provide some improvements, albeit smaller improvements.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of improving throughput conditions in a wireless communication network for a wireless multiple-input, multiple-output (MIMO) channel between a MIMO transmitter comprising an antenna array having a plurality of antennas and a MIMO receiver, the method comprising:
   determining that multiplicative noise limits the throughput conditions, said multiplicative noise comprising any noise dependent on or proportional to a signal strength at at least one of the MIMO transmitter and the MIMO receiver; and
   distributing a transmission power across one or more data streams communicated between the MIMO transmitter and the MIMO receiver based on knowledge at the transmitter of the MIMO channel, wherein the transmission power allocated to one or more of the data streams associated with a dominant signal path is decreased relative to the transmission power allocated to one or more of the data streams associated with a weaker signal path to increase at least one of a quality and a throughput condition of the MIMO channel.

2. The method of claim 1 wherein distributing the transmission power comprises distributing the transmission power across the data streams based on knowledge at the transmitter of the MIMO channel to maximize the channel capacity.

3. The method of claim 1 wherein distributing the transmission power comprises distributing the transmission power across one or more of the data streams based on MIMO channel information provided by the MIMO receiver.

4. The method of claim 3 wherein the MIMO channel information provided by the MIMO receiver comprises weight information corresponding to the one or more data streams associated with the dominant signal path.

5. The method of claim 3 wherein the MIMO channel information provided by the MIMO receiver comprises a weight matrix indicator corresponding to antenna weights selected for the data streams by the MIMO receiver.

6. The method of claim 3 wherein the MIMO channel information provided by the MIMO receiver comprises channel estimates.

7. The method of claim 3 wherein the MIMO channel information provided by the MIMO receiver comprises a channel quality indicator.

8. The method of claim 3 wherein the MIMO channel information provided by the MIMO receiver comprises a selected antenna rank indicating a preferred number of data streams for a future transmission.

9. The method of claim 1 wherein the dominant signal path comprises a line of sight signal path between the MIMO transmitter and the MIMO receiver.

10. The method of claim 1 further comprising receiving dominant signal path information from one of a remote communication node and the MIMO receiver, and identifying the dominant signal path between the MIMO transmitter and the MIMO receiver based on the received dominant signal path information.

11. The method of claim 1 further comprising identifying the dominant signal path between the MIMO transmitter and the MIMO receiver at the MIMO transmitter.

12. The method of claim 1 further comprising receiving a multiplicative noise evaluation at the MIMO communication node from a remote reporting node, wherein determining that multiplicative noise limits the throughput conditions comprises determining that multiplicative noise limits the throughput conditions based on the received multiplicative noise evaluation.

13. The method of claim 1 wherein determining that multiplicative noise limits the throughput conditions comprises:
   evaluating at least one of a MIMO operating parameter and a signal quality parameter associated with signals communicated between the MIMO transmitter and the MIMO receiver; and
   determining that multiplicative noise limits the throughput conditions based on at least one of the MIMO operating parameter and the signal quality parameter.

14. The method of claim 1 further comprising determining a transmit power allocation based on Shannon mutual information of the MIMO channel, wherein distributing the transmission power comprises distributing the transmission power across one or more of the data streams according to the determined transmit power allocation.

15. The method of claim 14 wherein determining the transmit power allocation based on the Shannon mutual information comprises determining one or more transmission powers that maximize the Shannon mutual information of the MIMO channel.

16. The method of claim 15 wherein determining the one or more transmission powers that maximize the Shannon mutual information comprises iteratively performing a gradient search through a plurality of possible transmission powers to determine the transmission powers that maximize the Shannon mutual information of the MIMO channel.

17. The method of claim 1 further comprising storing past multiplicative noise observations associated with at least one of the MIMO transmitter, the MIMO receiver, and a cell in the wireless communication network, wherein determining that multiplicative noise limits the throughput conditions comprises determining that multiplicative noise limits the throughput conditions based on the past multiplicative noise observations.

18. The method of claim 1 wherein distributing the transmission power comprises distributing the transmission power using precoder weights determined according to a singular value decomposition and subsequently applied to the data streams.

19. The MIMO transmitter of claim 18 wherein the power distribution circuit distributes the transmission power using precoder weights determined according to a singular value decomposition and subsequently applied to the data streams.

20. A multiple-input, multiple-output (MIMO) transmitter in a wireless communication network communicating with a MIMO receiver via a MIMO channel, the MIMO transmitter comprising:
 an antenna array having a plurality of antennas;
 a noise processor configured to determine that multiplicative noise limits the throughput conditions, said multiplicative noise comprising any noise dependent on or proportional to a signal strength at at least one of the MIMO transmitter and the MIMO receiver; and
 a power distribution circuit configured to distribute a transmission power across one or more data streams transmitted by the antennas based on knowledge at the transmitter of the MIMO channel to decrease the transmission power allocated to one or more of the data streams associated with a dominant signal path relative to the transmission power allocated to one or more of the data streams associated with a weaker signal path to increase at least one of a quality and a throughput condition of the MIMO channel.

21. The MIMO transmitter of claim 20 wherein the power distribution circuit distributes the transmission power by distributing the transmission power across the one or more data streams based on knowledge at the transmitter of the MIMO channel to maximize the channel capacity.

22. The MIMO transmitter of claim 20 further comprising a transceiver circuit configured to receive MIMO channel information, wherein the power distribution circuit distributes the transmission power by distributing the transmission power across one or more of the data streams based on the received MIMO channel information.

23. The MIMO transmitter of claim 22 wherein the received MIMO channel information comprises weight information corresponding to the one or more data streams associated with the dominant signal path.

24. The MIMO transmitter of claim 22 wherein the received MIMO channel information comprises a weight matrix indicator corresponding to antenna weights selected for the data streams by the MIMO receiver.

25. The MIMO transmitter of claim 22 wherein the received MIMO channel information comprises channel estimates.

26. The MIMO transmitter of claim 22 wherein the received MIMO channel information comprises a channel quality indicator.

27. The MIMO transmitter of claim 22 wherein the received MIMO channel information comprises a selected antenna rank indicating a preferred number of antennas for a future transmission.

28. The MIMO transmitter of claim 20 wherein the dominant signal path comprises a line of sight signal path between the MIMO transmitter and the remote receiver.

29. The MIMO transmitter of claim 20 further comprising:
 a transceiver circuit configured to receive dominant signal path information from a remote communication node; and
 a path circuit configured to identify the dominant signal path between the MIMO transmitter and the MIMO receiver based on the received dominant signal path information.

30. The MIMO transmitter of claim 20 further comprising a path circuit unit configured to identify the dominant signal path.

31. The MIMO transmitter of claim 20 further comprising a transceiver circuit to receive a multiplicative noise evaluation from a remote reporting node, wherein the noise processor determines that multiplicative noise limits the throughput conditions based on the received multiplicative noise evaluation.

32. The MIMO transmitter of claim 20 wherein the noise processor comprises:
 a parameter circuit configured to evaluate at least one of a MIMO operating parameter and a signal quality parameter associated with signals communicated between the MIMO transmitter and the remote receiver; and
 a characterization circuit configured to determine that multiplicative noise limits the throughput conditions based on at least one of the MIMO operating parameter and the signal quality parameter.

33. The MIMO transmitter of claim 32 further comprising a memory configured to store past multiplicative noise observations associated with at least one of a MIMO communication node and a cell in the wireless communication network, wherein the characterization circuit determines that multiplicative noise limits the throughput conditions based on the past multiplicative noise observations.

34. The MIMO transmitter of claim 20 wherein the power distribution circuit is further configured to determine a transmit power allocation based on Shannon mutual information of the MIMO channel, and wherein the power distribution circuit distributes the transmission power by distributing the transmission power across one or more of the data streams according to the determined transmit power allocation.

35. The MIMO transmitter of claim 34 wherein the power distribution circuit determines the transmit power allocation based on the Shannon mutual information by determining one or more transmission powers that maximize the Shannon mutual information of the MIMO channel.

36. The MIMO transmitter of claim 35 wherein the power distribution circuit determines the one or more transmission powers that maximize the Shannon mutual information by iteratively performing a gradient search through a plurality of possible transmission powers to determine the transmission powers that maximize the Shannon mutual information of the MIMO channel.

37. The MIMO transmitter of claim 20 wherein the MIMO transmitter comprises one of a pico site, a radio base station, an access point, a relay, a wireless backhaul node, and a user equipment.

* * * * *

UNITED STATES PATENT AND TRADEMARK OFFICE
CERTIFICATE OF CORRECTION

PATENT NO. : 8,891,657 B2
APPLICATION NO. : 13/714646
DATED : November 18, 2014
INVENTOR(S) : Medbo et al.

Page 1 of 1

It is certified that error appears in the above-identified patent and that said Letters Patent is hereby corrected as shown below:

In the Specification

In Column 5, Line 11, delete "receiver node 210" and insert -- receiver node 200 --, therefor.

In Column 9, Line 55, after Equation (9), insert -- , --.

In the Claims

In Column 15, Line 24, in Claim 19, delete "MIMO transmitter of claim 18" and insert -- method of claim 18 --, therefor.

In Column 16, Line 24, in Claim 30, delete "circuit unit" and insert -- circuit --, therefor.

Signed and Sealed this
Thirtieth Day of June, 2015

Michelle K. Lee
*Director of the United States Patent and Trademark Office*